(12) United States Patent
Chen et al.

(10) Patent No.: US 12,283,399 B2
(45) Date of Patent: Apr. 22, 2025

(54) INSULATING GAS COMPOSITION

(71) Applicant: ROLLS-ROYCE plc, London (GB)

(72) Inventors: Lujia Chen, Manchester (GB); Ian Cotton, Manchester (GB); Alexander C Smith, Holmfirth (GB); Jameel B Khan, Manchester (GB)

(73) Assignee: ROLLS-ROYCE plc, London (GB)

( * ) Notice: Subject to any disclaimer, the term of this patent is extended or adjusted under 35 U.S.C. 154(b) by 378 days.

(21) Appl. No.: 17/843,173

(22) Filed: Jun. 17, 2022

(65) Prior Publication Data
US 2023/0012807 A1 Jan. 19, 2023

(30) Foreign Application Priority Data
Jul. 13, 2021 (GB) .................................... 2110043

(51) Int. Cl.
*H01B 3/02* (2006.01)
*B64D 27/02* (2006.01)
*B64D 27/24* (2006.01)
*H01B 3/56* (2006.01)

(52) U.S. Cl.
CPC ............... *H01B 3/02* (2013.01); *B64D 27/24* (2013.01)

(58) Field of Classification Search
CPC .......... H01B 3/56; H01B 3/02; B64D 27/026; B64D 2221/00
See application file for complete search history.

(56) References Cited

U.S. PATENT DOCUMENTS

| | | | |
|---|---|---|---|
| 2,853,540 | A | 9/1958 | Camilli et al. |
| 3,048,648 | A | 8/1962 | Plump et al. |
| 10,999,897 | B2 | 5/2021 | Mantilla et al. |
| 2015/0228375 | A1 | 8/2015 | Kieffel et al. |
| 2018/0040391 | A1 | 2/2018 | Kieffel et al. |
| 2019/0156968 | A1 | 5/2019 | Gautschi et al. |

FOREIGN PATENT DOCUMENTS

WO 2013151741 A1 10/2013

OTHER PUBLICATIONS

Great Britain search report dated Aug. 25, 2021, issued in GB Patent Application No. 2110043.3.
Tu Youping, et al. "Feasibility of CFCN/COgas mixtures in high-voltage DC GIL: a review on recent advances", High Voltage, The Institution of Engineering and Technology, Michael Faraday House, vol. 5, No. 4, Jul. 2, 2020.
Cheetham, et al., "Gas Insulated Medium Voltage Power Distribution Networks", 2020 IEEE Electrical Insulation Conference, Jun. 22, 2020, pp. 37-40.
Wang, et al., "Characteristics of C3F7CN/CO2 as an alternative to SF6 in HVDC-GIL systems, IEEE Transactions on Dielectrics and Electrical Insulation", IEEE Service Center, vol. 25, No. 4, Aug. 10, 2018.
Li Yi, et al., "Decomposition Properties of C 4 F 7 N/N 2 Gas Mixture: An Environmentally Friendly Gas to Replace SF 6", Industrial & Engineering Chemistry Research, vol. 57, No. 14, Apr. 11, 2018, pp. 5173-5182.

(Continued)

*Primary Examiner* — Hoa C Nguyen
*Assistant Examiner* — Amol H Patel

(57) ABSTRACT

An electrically insulating gas composition comprises $C_3F_7CN$, in an amount between 22% and 70% by volume and one or more inert gas selected from the list consisting of nitrogen, carbon dioxide (CO2), air and argon.

9 Claims, 2 Drawing Sheets

(56) References Cited

OTHER PUBLICATIONS

Yuan Zhikang, et al. "Study on Electric Strength and Synertistic Effect of C3F7CN-CO2 Gas Mixture by Steady State Townsend Method", 2019 IEEE 20th International Conference, Jun. 23, 2019, pp. 1-4.
Zhong, et al., "Effects of Buffer Gases on Plasma Properties and Arc Decaying Characteristics of CFN-Nand CFN-COArc Plasmas", Plasma Chemistry and Plasma Processing, Plenum Press, vol. 39, No. 6, Jul. 18, 2019, pp. 1379-1396.
European search report dated Nov. 29, 2022, issued in EP Patent Application No. 22178563.7.

INSULATING GAS COMPOSITION

CROSS-REFERENCE TO RELATED PATENT APPLICATIONS

This application is based upon and claims the benefit of priority from British Patent Application No. GB 2110043.3, filed on 13 Jul. 2021, the entire contents of which are herein incorporated by reference.

BACKGROUND

Technical Field

The present disclosure concerns an insulating gas composition for use in low pressure environments such as aircraft designed to operate at high altitudes. The disclosure also concerns an electrical system utilising such a composition, and an aircraft comprising such an electrical system.

Description of Related Art

Aircraft designers are increasingly looking towards high voltage electrical systems on aircraft (i.e. voltages greater than 1,000 Volts). Such high voltages permit high power usage onboard the aircraft, such as for electrical propulsion, without requiring the transmission of excessively high currents, which would in turn necessitate an increase in electrical system weight. The combination of high voltages and operating environment of the aircraft adds complexity to the design of insulation systems. In terrestrial power systems, insulating gases such as Sulphur Hexafluoride ($SF_6$) have been shown to allow the compaction of high voltage equipment, however, such gases have a high Global Warming Potential (GWP) and are as such being phased out. Identifying a suitable insulating gas for use in the aerospace environment must consider the particular challenges including high temperature and pressure ranges encountered by aircraft, including very low temperatures (less than −50° C.) and atmospheric pressures well below sea level atmospheric pressure. At such temperatures and voltages, conventional insulating gas compositions are subject to one or both of liquefaction and electrical breakdown.

SUMMARY

Consequently, the present disclosure seeks to provide an electrically insulating gas composition and a system utilising this composition which wholly or partly overcomes these issues and may allow for compaction and more reliable operation of an aircraft high voltage electrical system. Additional advantages of the composition are also provided, as set out below.

All relative percentage values are given in terms of volume percentage, unless otherwise stated.

According to a first aspect of the disclosure there is provided an electrically insulating gas composition comprising:
  a gas comprising $C_3F_7CN$, in an amount between 22% and 70% by volume;
  one or more inert gas selected from the list consisting of nitrogen, carbon dioxide ($CO_2$), air and argon.

Advantageously, it has been found that the above composition provides a higher breakdown voltage and remains in a gaseous state at lower temperatures compared to previous insulating gas compositions, while having a low GWP. Consequently, the composition is suitable for use in aircraft electrical systems which operate at high voltages at high altitudes, without a requirement for heating and/or high pressure differentials between enclosed insulated components and external pressure outside the aircraft.

The composition may comprise $C_3F_7CN$ in an amount between 25% and 40% by volume, with the remainder of the composition consisting of $CO_2$, save for incidental impurities.

The composition may comprise $C_3F_7CN$ in an amount between 22% and 70% by volume, with the remainder of the composition consisting of one or more of carbon dioxide, nitrogen and oxygen. The provision of oxygen in the mixture can minimise the production of soot or carbon monoxide in use.

In a first example, the composition may comprise a mixture of 30% by volume $C_3F_7CN$ in a binary mixture with 70% carbon dioxide.

In a second example, the composition may comprise a mixture of 30% by volume $C_3F_7CN$ in a binary mixture with 70% nitrogen.

In a third example, the composition may comprise 40% $C_3F_7CN$ by volume, in a binary mixture with 60% carbon dioxide.

In a fourth example, the composition may comprise 70% $C_3F_7CN$ by volume, in a binary mixture with 30% carbon dioxide.

According to a second aspect of the disclosure, there is provided a high voltage electrical system suitable for an aircraft comprising:
  an enclosure containing an electrically insulating gas composition according to the first aspect of the disclosure; and
  an electrical device insulated by the insulating gas composition.

The electrical system may comprise a pressurisation system configured to maintain the electrically insulating gas in the enclosure at an absolute pressure of between 50 kPa and 200 kPa. The gas mixture is suitable for use at relatively low pressures. Accordingly, pressure differentials between the electrical device and ambient atmosphere are minimised, thereby reducing structural weight requirements, and reducing leakage flow rate in the event of a containment failure.

According to a third aspect of the present disclosure there is provided a method of insulating a high voltage electrical system of an aircraft, the method comprising:
  providing an enclosure containing a high voltage electrical component, filled with an insulating gas according to the first aspect, at a pressure between 10 kPa and 200 kPa.

In one example, the insulating gas comprises approximately 25% $C_3F_7CN$ and 75% of an inert buffer gas, and the enclosure is arranged to be maintained at a pressure of between 60 kPa and 100 kPa.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
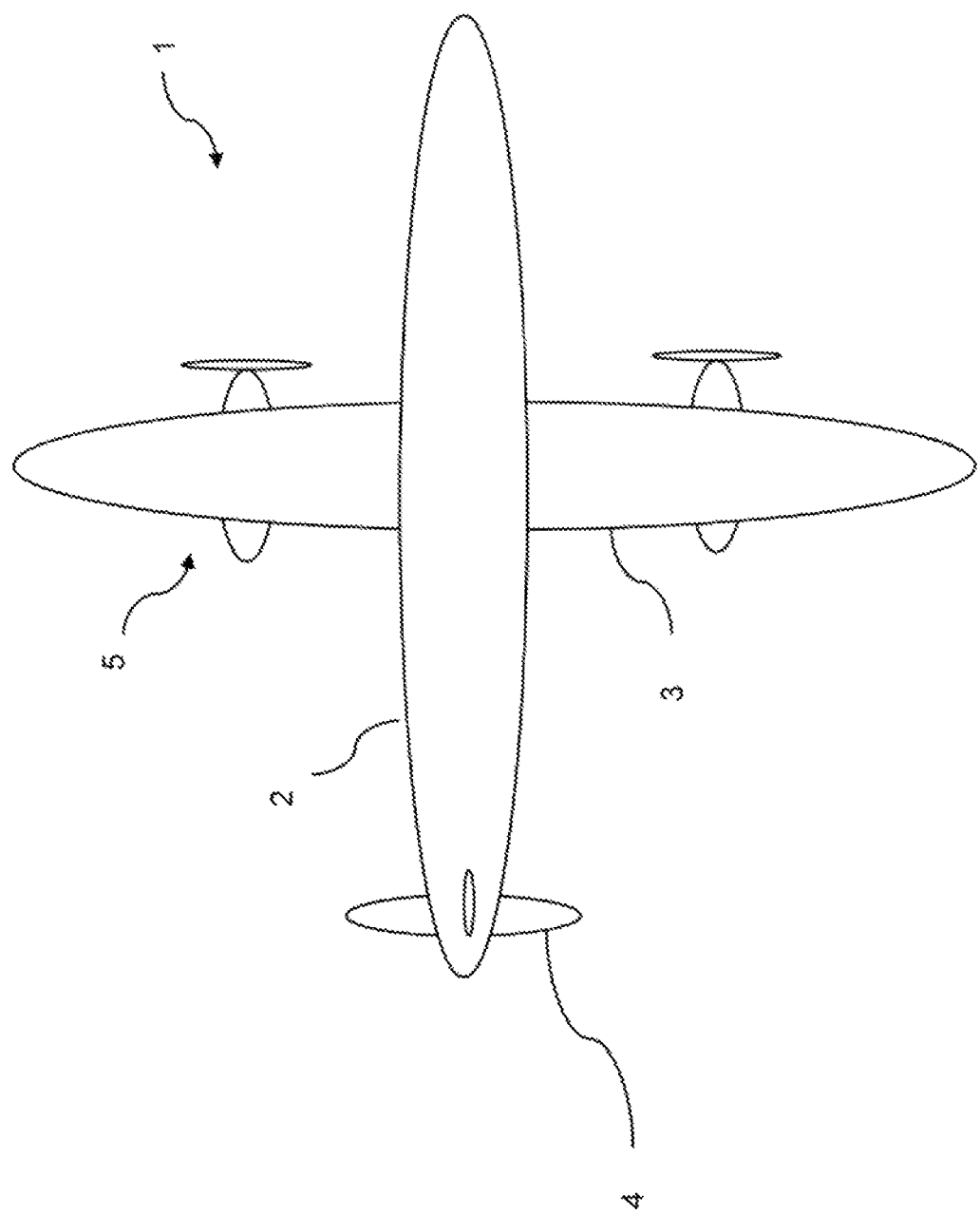
FIG. 1 is a plan view of a first aircraft comprising a parallel hybrid propulsion system.

With reference to FIG. 1, an aircraft 1 is shown. The aircraft is of conventional configuration, having a fuselage 2, wings 3, tail 4 and a pair of propulsion systems 5. One of the propulsion systems 5 is shown in figure detail in FIG. 2.

Figure 2:
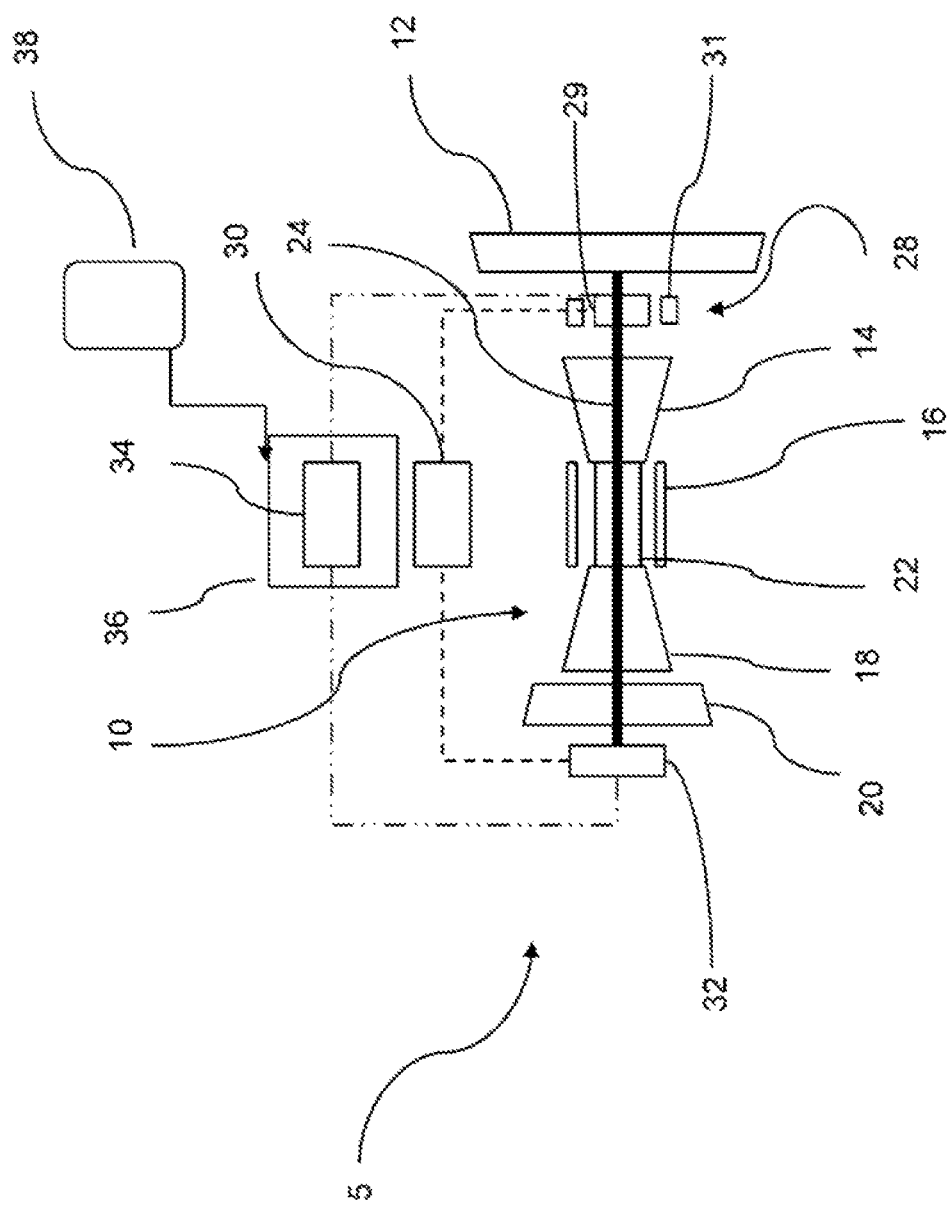
FIG. 2 is a schematic diagram of a parallel hybrid propulsion system for the aircraft of FIG. 1.

FIG. 2 shows the propulsion system 5 schematically. The propulsion system 5 includes one or more electrical machines driving one or more propulsors. In particular, the system 5 comprises an electric motor 28. The motor 28 is of a conventional type, such as an induction or permanent magnet electric machine, and is configured to drive a propulsor such as a fan 12. In this embodiment, the electric motor 28 comprises a rotor 29 of surrounded by a stator 31 provided radially outwardly of the rotor 29. The stator comprises electrical windings (not shown), which can be energised to produce a rotating magnetic field. This rotating magnetic field interacts with a magnetic field of the rotor 29, to cause rotation when acting as a motor. Consequently, the fan 12 may be powered by either or both of the gas turbine engine 10 via the low-pressure turbine 20, and the motor 28.

The propulsion system 5 comprises further electrical components. For example, the electric motor 28 is coupled to an energy storage device 30 in the form of one or more of a chemical battery, fuel cell, and capacitor, which provides the electric motor 28 with electrical power during operation. In some cases, multiple energy storages systems, which may be of different types (chemical battery, fuel cell etc) may be provided for each propulsion system 5. In other cases, a common energy storage device 30 may be provided for multiple propulsion systems.

The propulsion system further comprises a generator 32, which is coupled to one or both of the motor 28 and the energy storage device 30, such that additional electrical energy can be provided in operation. The generator 32 is driven by a prime mover such as a gas turbine engine 10.

A controller 34 is provided, which is configured to control at least the motor 28 and energy storage device 30, to control the torque provided by the motor 28, and the charging/discharging of the energy storage device 30. The controller 34 may also be configured to control operation of the generator 32, to control electrical power produced by the generator 32.

Each of the controller 34, motor 28, electrical energy storage device 30 and generator 32 are interconnected by high voltage electrical interconnectors (shown as dotted lines in the drawings). One or more power electronics devices such as controller 34 may be provided for stepping up or down voltages or frequencies between components. At various stages, the electrical power may be in a Direct Current (DC) or Alternating Current (AC) form. In one example, the interconnectors are configured to carry high voltage power at approximately 1,000 Volts or more. In further examples, higher voltages could be employed, such as 5,000 volts or even higher.

Each of the components must have an insulation system that allows them to operate safely and reliably. The insulation must be capable of preventing the flow of excess current as a result of a breakdown/flashover and must prevent partial discharge that can limit the lifetime of the insulation system. The management of partial discharge activity while delivering a power dense motor/power electronic system is a particular challenge.

It will be appreciated that such electrical insulation may be provided, at least in part, by air gaps and solid or liquid insulators, such as organic or inorganic insulation materials, including ceramic and polymeric insulators. However, solid insulators add significant weight and bulk to the system, which is to be avoided in aircraft systems. Similarly, air is a poor insulator at low pressures. Conventionally, large air gaps are required, which further increases the volume occupied by the electrical system. Additionally, the increased thickness of solid electrical insulation that may be required to prevent partial discharge may have a negative impact on the thermal performance of the insulation system and prevent heat dissipation from components. Consequently, the electrical components may be subject to increased temperatures in use, which may necessitate increased cooling flows, or may result in decreased life.

An alternative solution is the provision of insulating gases.

In the present disclosure, one or more electrical components are contained within a gas-tight enclosure, containing a gas mixture, as described below. For example, the controller 34 is housed within a container 36, which houses the high voltage components. The container 36 may comprise a conductive material, which allows the container 36 to be grounded. Electrically insulating supports (not shown) may extend from the container 36 walls to the electrical components therein to centre the components, to maintain spacing between the components and the conductive walls. A gas reservoir 38 is provided in communication with the container 36, to re-fill the container and control the pressure therein in the event of a leakage of gas. It will be understood that other electrical components of the electrical system can similarly be contained within suitable air-tight, gas-filled enclosures.

Typically, the enclosures are rigid, and configured to maintain the gas therein within a relatively narrow pressure range Consequently, the gas can be maintained in a gaseous state, regardless of external atmospheric conditions.

Alternatively, the enclosures may be non-rigid, and may expand as the external pressure falls, such that the internal pressure substantially matches the external pressure. For example, the enclosure may comprise flexible tubing formed of a plastics material. Again, electrically insulating spacers may be provided to maintain a spacing between the walls and the electrical components. In such a case, the mixture is maintained in a gaseous state at low temperatures at high altitude by the low pressures within the enclosure.

Relatively little work has been conducted on suitable insulating gases which can tolerate the low temperature and pressure environment experienced onboard an aircraft flying at high altitude. One proposal has been to use Sulphur hexafluoride ($SF_6$). However, $SF_6$ is currently being phased out due to its high Global Warming Potential (GWP).

Consequently, it is desired to provide an insulating gas mixture which on its own or in combination with any other insulation system meets at least the following requirements:
1. A liquefaction temperature below the ambient temperatures experienced by the aircraft in question, such as passenger civil aircraft which may experience temperatures as low as (−55° C.), at low pressure.
2. A Partial Discharge Inception voltage (PDIV) and breakdown voltage higher than that required for safe and reliable operation of the system.
3. A low GWP
4. No excessive handling requirements (e.g. low flammability etc)

5. Compatibility with materials used in electric machines and other components (e.g. low corrosiveness).

The inventors of the present disclosure have experimented with pure $C_3F_7CN$ fluoro-nitrile gas. However, such gas has a liquefaction temperature of −4.7° C. at 1 Bar (atmospheric pressure), and so cannot be used alone in aerospace environments.

The inventors of the present disclosure have found that a mixture of o $C_3F_7CN$ fluoro-nitrile, at a concentration of between 25% and 70% in combination with an inert gas such as one or more of nitrogen, carbon dioxide ($CO_2$) and argon provides an electrically insulating mixture, which meets the above requirements.

The use of the above insulating gas has a number of further advantages. When used in place of air, electric machine reliability may be increased, due to the elimination or reduction in partial discharge. As a result, the use of corona-resistant materials that have a finite lifetime can be minimised. Similarly, compact end-windings and cable terminations can be provided. In view of the performance of the mixture at low temperatures and pressures, temperature and pressure-controlled environments can be avoided, and only sealing to prevent gas leakage is required. Consequently, containment weight and bulk are reduced, thus reducing system weight, cost and bulk further.

The inventors have determined a number of example gas mixtures, which may be suitable for different aircraft and/or use cases. For example, the inventors have found that, by tailoring the partial pressure of the component gases, the boiling point, dielectric strength and mechanical capability of the enclosures can be optimised for the specific application.

Example 1

In a first example, the gas mixture is suitable for an aircraft flying at altitudes up to 40,000 feet and experiencing ambient pressures of approximately 18 kPa. The enclosure is pressurised to a constant absolute pressure of approximately 60 kPa, irrespective of altitude.

In this case, a mixture of 30% by weight $C_3F_7CN$ is provided, in a binary mixture with 70% carbon dioxide ($CO_2$). At this mixture ratio, the gas provides the necessary dielectric strength with a workable boiling point for optimised dielectric performance against the requirements of the enclosure mechanical strength and suitability of the boiling point for the operating environment.

Experiments have been carried out with this mixture using an apparatus comprising Damid W210 wire with an insulation thickness of 28 microns representative of a typical insulation used between the turns of an electrical machine. A wire tested in pure $C_3F_7CN$ can have almost double the PDIV value when compared to one tested in atmospheric air. However, the liquefaction temperature is too high for an aerospace application. However, at 60 kPa absolute pressure, the 30% $C_3F_7CN$/70% $CO_2$ mixture results in a PDIV 1.5 times higher than that atmospheric air while providing a lower liquefaction temperature suitable for a high altitude, low pressure aerospace environment.

Such an insulating gas can also provide for significantly reduced clearances in high voltage electrical equipment. For example, in a 3.3 kV Insulated Gate Bipolar transistor (IGBT) power electronics module, external clearances can reduced by approximately 60 to 65% compared to the use of air.

Such a mixture may be used at higher pressures without liquefaction, provided the minimum temperature is increased. For example, pressures up to 300 kPa could be used, provided the minimum temperature is no less than −10° C.

Example 2

In a second example, the gas mixture is suitable for an aircraft flying at altitudes up to 40,000 feet, and experiencing ambient pressures of approximately 18 kPa. The enclosure is pressurised to an absolute pressure of approximately 60 kPa at altitude.

In this case, a mixture of 30% by volume $C_3F_7CN$, in a binary mixture with 70% Nitrogen ($N_2$). At this mixture ratio, the gas provides the necessary dielectric strength with a workable boiling point for optimised dielectric performance against the requirements of the enclosure mechanical strength and suitability of the boiling point for the operating environment. By replacing the $CO_2$ gas with nitrogen, the boiling point is reduced slightly by a few degree Celsius, which enables the gas to be used in a lower temperature environment.

The inventors have found that such a mixture may provide slightly lower PDIV performance (approximately 5 to 10% under similar conditions) compared to a mixture comprising $CO_2$. However, this may be compensated by increased the operating pressure (e.g. to 100 kPa), or increasing the percentage of $C_3F_7CN$, for example up to 40%.

Similar modifications could be made, by replacing the $CO_2$ inert buffer gas with any of argon or air, or a mixture of two or more inert gases. provided the inert buffer gas has a liquefaction temperature above the ambient temperature, at the operating pressures.

Example 3

In a third example, the gas mixture comprises 40% $C_3F_7CN$ by volume, in a binary mixture with 60% $CO_2$. In this example, the gas mixture is maintained at pressure between 60 kPa and 200 kPa, to maintain the mixture in a gaseous state. For such a case, the mixture must be operated at a temperature above −10° C. to prevent liquefaction. In an example where the pressure is maintained at a constant 60 kPa, the mixture will provide for a 70% reduction in clearance in comparison to the use of atmospheric air.

In view of the higher temperature requirements for such a mixture, this mixture may either be restricted to aircraft which operate at lower altitudes, or for higher temperature environments. For example, many electrical systems generate significant heat during use, which may be adequate to maintain the temperature within the enclosure above −10° C. at all times, even where external temperatures are much lower. Consequently, several different mixtures may be used in the same aircraft, for use in different environments.

Alternatively, the gas mixture is operated at a higher temperature (e.g. at a lower altitude, or with thermal insulation) to maintain the mixture in a gaseous state.

For this mixture, in a 3.3 kV Insulated Gate Bipolar transistor (IGBT) power electronics module, external clearances can reduced by approximately 70% compared to the use of air.

Example 4

In a fourth example, the mixture comprises 70% $C_3F_7CN$ by volume, in a binary mixture with 30% $CO_2$. In this example, the gas mixture is maintained at a pressure of 40 kPa. Again, such a mixture would be restricted to temperatures no less than −10° C.

The insulating gas mixture disclosed herein can be utilised in a number of different electric components and parts thereof for aerospace applications, such as the following:

Random-wound machines—Random-wound stators are conventionally used in machines rated at less than 1 kV and at power levels of a few hundred kilowatts. Experimental data have shown that a mixture of 25% $C_3F_7CN$ and 75% $CO_2$ mixed at 0.6 bar (60 kPa.) improves the PDIV of the machine insulation system by 1.64 times that in comparison to air under atmospheric pressure. The use of the 0.6 bar (absolute) pressure for the mixture ratio provides a liquefaction temperature of −50° C., which would be feasible to operate random-wound machines at a higher voltage and power level in an aerospace environment without the presence of life limiting partial discharge.

Form-wound machines—In form wound machines, there is a need to separate the end windings by a specific spacing to prevent partial discharge and to install a stress grading system to manage the electric field as the winding exits the slot. The use of an insulating gas such as $C_3F_7CN$ and $CO_2$ with a significantly higher PDIV would allow the end winding to have a better machine packing factor and minimise the diameter of the machine.

Power electronics—In a power electronic enclosure, the use of $C_3F_7CN$ and $CO_2$ mixture at 0.6 bar (abs.) can achieve up to 50% reduction in the electrical clearances when compared with air under atmospheric pressure at altitude. The use of power electronic enclosures insulated by $C_3F_7CN$ and $CO_2$ mixture can reduce risks in relation to the spacing between high voltage components (i.e. creepage and clearance distances) and minimise partial discharge activities in components such as busbar and inductor.

Consequently, an insulating gas mixture is described, which provides improved performance, with reduced GWP at low pressures and temperatures, thereby precluding the need for heavy enclosures.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, the system could include a reservoir, which can refill the gas filled enclosure in the event of a gas leak, while maintaining the pressure at the desired level.

Similarly, it will be understood that the composition may include incidental impurities.

The invention claimed is:

1. A high voltage electrical system suitable for an aircraft comprising:
   an enclosure containing an electrically insulating gas composition comprising:
     $C_3F_7CN$, in an amount between 22% and 70% by volume;
     one or more inert gas selected from the list consisting of nitrogen, carbon dioxide ($CO_2$), air and argon;
   an electrical device insulated by the electrically insulating gas composition; and
   a pressurisation system configured to maintain the electrically insulating gas composition in the enclosure at an absolute pressure of between 50 kPa and 200 kPa.

2. The high voltage electrical system suitable for an aircraft according to claim 1, wherein the electrically insulating gas composition comprises $C_3F_7CN$ in an amount between 22% and 40% by volume, with the remainder of the electrically insulating gas composition consisting of $CO_2$, save for incidental impurities.

3. The high voltage electrical system suitable for an aircraft according to claim 1, wherein the electrically insulating gas composition comprises $C_3F_7CN$ in an amount between 22% and 70% by volume, with the remainder of the electrically insulating gas composition consisting of one or more of carbon dioxide, nitrogen and oxygen.

4. The high voltage electrical system suitable for an aircraft according to claim 3, wherein the electrically insulating gas composition comprises a mixture of 30% by volume $C_3F_7CN$ in a binary mixture with 70% carbon dioxide.

5. The high voltage electrical system suitable for an aircraft according to claim 3, wherein the electrically insulating gas composition comprises a mixture of 30% by volume $C_3F_7CN$ in a binary mixture with 70% nitrogen.

6. The high voltage electrical system suitable for an aircraft according to claim 3, wherein the electrically insulating gas composition comprises a mixture of 40% $C_3F_7CN$ by volume, in a binary mixture with 60% carbon dioxide.

7. The high voltage electrical system suitable for an aircraft according to claim 3, wherein the electrically insulating gas composition comprises a mixture of 70% $C_3F_7CN$ by volume, in a binary mixture with 30% carbon dioxide.

8. A method of insulating a high voltage electrical system of an aircraft, the method comprising:
   providing an enclosure containing a high voltage electrical component, filled with an insulating gas at a pressure between 10 kPa and 200 kPa, the insulating gas comprising:
     $C_3F_7CN$, in an amount between 22% and 70% by volume;
     one or more inert gas selected from the list consisting of nitrogen, carbon dioxide ($CO_2$), air and argon.

9. A method according to claim 8, wherein the insulating gas comprises approximately 25% $C_3F_7CN$ and 75% of an inert buffer gas, and the enclosure is arranged to be maintained at a pressure of between 60 kPa and 100 kPa.

* * * * *